(12) United States Patent
Sandoval et al.

(10) Patent No.: US 6,398,976 B1
(45) Date of Patent: Jun. 4, 2002

(54) COATED ROOFING INSULATION AND ROOFING SYSTEMS INCLUDING SUCH INSULATIONS

(75) Inventors: Christopher Paul Sandoval; Mary Margaret Georgene Bauer, both of Littleton; Craig Donald DePorter, Denver; Mauro Vittorio Battaglioli, Lone Tree, all of CO (US)

(73) Assignee: Johns Manville International., Inc., Denver, CO (US)

( * ) Notice: Subject to any disclaimer, the term of this patent is extended or adjusted under 35 U.S.C. 154(b) by 125 days.

(21) Appl. No.: 09/665,738

(22) Filed: Sep. 20, 2000

Related U.S. Application Data

(60) Division of application No. 09/503,253, filed on Feb. 14, 2000, now Pat. No. 6,177,024, which is a continuation-in-part of application No. 09/251,060, filed on Feb. 18, 1999, now Pat. No. 6,149,831.

(51) Int. Cl.$^7$ .............. E04B 1/74; E04B 5/00; E04B 7/00
(52) U.S. Cl. .......... 252/62; 427/372.2; 427/397.8; 427/186; 428/141; 428/146; 428/147; 428/148; 106/164.5; 106/162.51; 106/164.53; 106/164.6; 106/204.01; 106/216.1; 106/217.01; 106/DIG. 2; 106/282; 106/632; 106/634
(58) Field of Search .............. 252/62; 106/217.01, 106/164.5, 162.51, 164.53, 164.6, 204.01, 216.1, DIG. 2, 282, 632, 634; 428/141, 146, 147, 148; 427/372.2, 397.8, 186

(56) References Cited

U.S. PATENT DOCUMENTS

| | | | | |
|---|---|---|---|---|
| 3,988,199 A | * | 10/1976 | Hillmer et al. | 162/101 |
| 4,126,512 A | * | 11/1978 | Hill | 162/145 |
| 4,441,295 A | * | 4/1984 | Kelly | 52/309.8 |
| 4,707,961 A | * | 11/1987 | Nunley et al. | 156/71 |
| 4,936,070 A | * | 6/1990 | Michaud | 52/40 |
| 5,740,647 A | * | 4/1998 | Kelly | 52/199 |
| 5,749,954 A | * | 5/1998 | Law et al. | 106/162.51 |
| 6,004,645 A | * | 12/1999 | Hubbard | 428/119 |

* cited by examiner

Primary Examiner—Michael Marcheschi
(74) Attorney, Agent, or Firm—Robert D. Touslee

(57) ABSTRACT

A single ply membrane roofing system includes a roofing insulation board which, preferably, is at least 45% by dry weight expanded perlite. One major surface of the insulation board is coated with a latex coating comprising, by dry weight, between 48.3% and 96% clay; between 3.1% and 33.3% latex; and between 0% and 34% sodium silicate. A single ply roofing membrane is adhered to the coated major surface of the insulation board with a roofing contact adhesive.

6 Claims, 1 Drawing Sheet

COATED ROOFING INSULATION AND ROOFING SYSTEMS INCLUDING SUCH INSULATIONS

This application is a division of application Ser. No. 09/503,253, filed Feb. 14, 2000, U.S. Pat. No. 6,177,024, which is a continuation-in-part of application Ser. No. 09/251,060, filed Feb. 18, 1999, U.S. Pat. No. 6,149,831.

BACKGROUND OF THE INVENTION

The present invention relates to roofing insulation used in single ply roofing membrane systems, and, in particular, to roofing insulation boards coated on a major surface with a latex containing coating to improve the adherence of single ply roofing membranes to the roofing insulation boards.

Single ply roofing membrane systems are commonly used as roofing systems for low sloping roofs, especially in industrial and commercial applications. Typically, these single ply roofing membrane systems include roofing insulation boards, such as but not limited to perlite insulation boards, wood fiber insulation boards, glass fiber insulation boards, polymer foam insulation boards, and composite insulation boards made up of two or more layers of different materials, such as perlite based, wood fiber based, glass fiber based and polymer foam board layers. These roofing insulation boards are secured to the roof deck by mechanical fasteners or other conventional means. Of the above listed roofing insulation boards, perlite roofing insulation boards, such as perlite insulation boards sold by Johns Manville International, Inc., under the trademark FESCO®, have several advantages over the other types of roofing insulation boards. For example, these perlite roofing insulation boards are typically lower in density and absorb less water than wood fiber roofing insulation boards and, the high inorganic content of the perlite roofing boards, renders the perlite roofing insulation boards much less flammable than the typical wood fiber roofing insulation boards.

A single ply roofing membrane, such as but not limited to membranes made of ethylene propylene diene terpolymer rubber (EPDM), ethylene propylene rubber (EPR), and alloys of ethylene propylene diene terpolymer rubber (EPDM) or ethylene propylene rubber (EPR) with polypropylene (thermoplastic olefin elastomers or TPO's) or poly (vinyl chloride), overlay and are secured to the upper major surfaces of the roofing insulation boards by conventional mechanical fasteners or with commercially available roofing contact adhesives. These single ply roofing membranes may or may not include reinforcing meshes or scrims located intermediate layers of the material forming the single ply roofing membrane.

SUMMARY OF THE INVENTION

The present invention relates to roofing insulation boards having upper major surfaces which are coated with a latex containing coating to improve the bond between the overlaying single ply roofing membrane and the roofing insulation boards when the overlaying single ply roofing membranes are adhesively bonded to the roofing insulation boards and to roofing systems incorporating such coated roofing insulation boards. To improve the bond between the upper major surface of the insulation board and the single ply roofing membrane, the upper major surface of the insulation board is coated with a coating including, by dry weight, between 48.3% and 96% filler, between 3.1% and 33.3% latex; and 0% to 34% sodium silicate.

DESCRIPTION OF THE PREFERRED EMBODIMENTS

Figure 1:
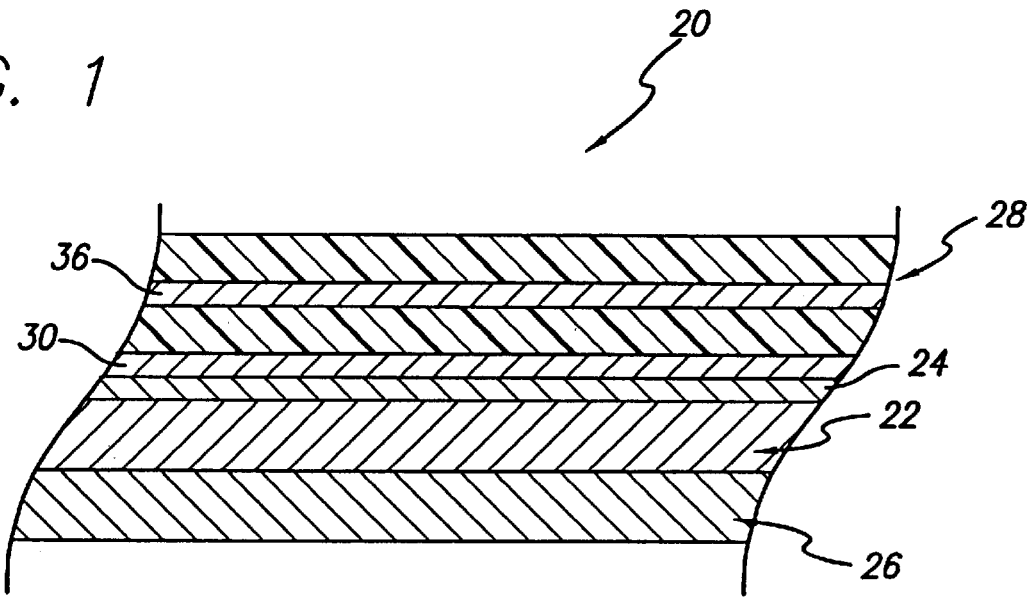
FIG. 1 is a schematic, partial vertical cross section through a single ply roofing membrane system incorporating a coated roofing insulation board of the present invention.
Figure 2:
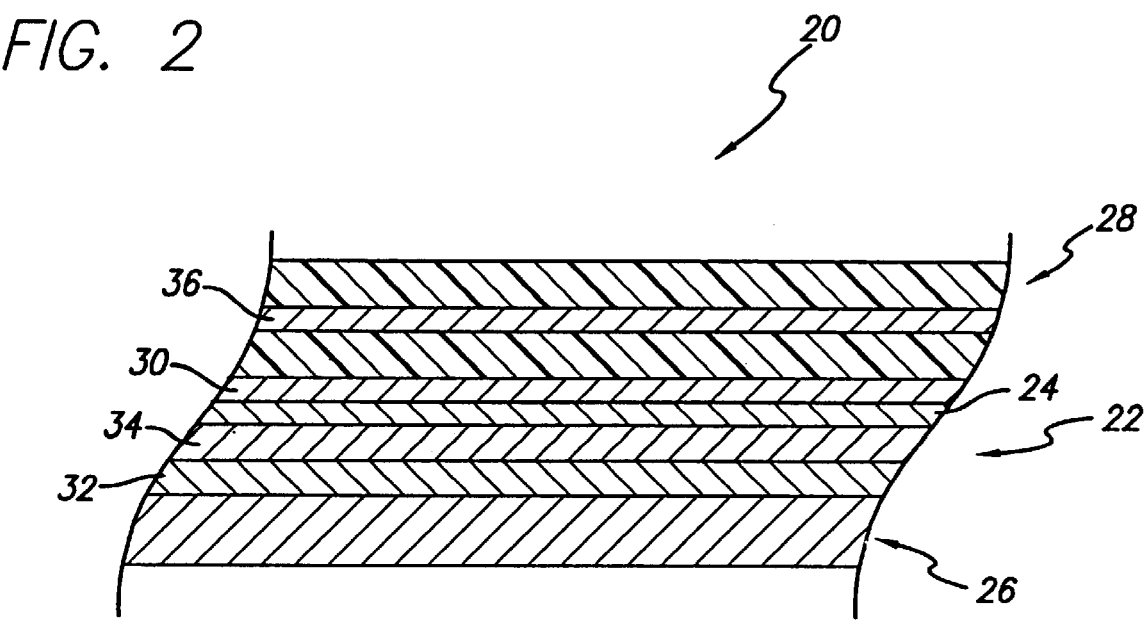
FIG. 2 is a schematic, partial vertical cross section through a single ply roofing membrane system incorporating a coated composite roofing insulation board of the present invention.

As shown in FIGS. 1 and 2, the single ply roofing membrane system of the present invention 20 includes roofing insulation boards 22 that are coated on their upper major surfaces with a latex containing coating 24 to enhance the adhesion of a single ply roofing membrane to the insulation boards. The roofing insulation boards are nailed or otherwise secured to a roofing deck 26 by conventional mechanical fasteners. The single ply roofing membrane system 20 also includes a single ply roofing membrane 28 overlaying the roofing insulation boards 22 and bonded to the coated upper major surfaces of the roofing insulation boards by a conventional roofing contact adhesive 30. Preferably, the single ply roofing membrane is fully adhered to the upper major surfaces of the roofing insulation boards. The term "fully adhered", as used herein, means the single ply roofing membrane is attached or secured to the substrate with 100% of the area which the single ply roofing membrane overlays having the specified bonding adhesive.

The roofing insulation boards 22 used in the single ply roofing membrane system 20 include, as shown in FIG. 1, perlite or wood fiber insulation boards; and, as shown in FIG. 2, composite insulation boards which can include a layer 32 of polymer foam board, such as isocyanurate foam board, and/or a layer of glass fiber board in addition to a layer of perlite or wood fiber board 34. When composite roofing insulation boards 22 are used, the board layers 34 forming the upper major surfaces of the roofing insulation boards, the surfaces to which the single ply roofing membrane 28 is adhered, should be either perlite based or wood fiber based and, preferably, perlite based. These insulation boards 22 are typically 2 by 4 feet, 4 by 4 feet, or 4 by 8 feet in width and length and typically range from about ½ of an inch to about 1 1/12 inches in thickness. While the wood fiber roofing insulation boards and composite roofing insulation boards including glass fiber insulation board layers and/or polymer foam insulation board layers can be used in the single ply roofing membrane system 20, perlite based insulation boards are preferred. The perlite insulation boards are typically lower in density than the wood fiber insulation boards. While the wood fiber insulation boards typically have a density ranging from about 18 to about 22 pounds per cubic foot (pcf), the perlite insulation boards typically have densities ranging from about 8 to about 14 pcf. In addition, the perlite insulation boards absorb less water than the wood fiber insulation boards. Due to the high inorganic content of the perlite insulation boards, the perlite based insulation boards are less flammable than the wood fiber insulation boards.

The perlite based insulation boards 22, preferred for use in the single ply roofing membrane system 20, include, by dry weight, about 45% to about 76% expanded perlite; about 15% to about 45% cellulosic fibers; about 0.1% to about 10% latex binder, about 2% to about 9% bituminous material; and 0% to about 3% alum and, preferably, about 50% to about 72% expanded perlite; about 23% to about 35% cellulosic fibers; about 1% to about 8% latex binder, about 2% to about 9% bituminous material; and 0% to about 3% alum. While other cellulosic fibers can be included in the product, e.g. up to about 45% by dry weight of the fibers in the product, preferably, the cellulosic fibers are recycled newsprint fibers. As used herein, the term recycled newsprint fibers also includes recycled telephone book fibers and similar fibers.

The perlite particles used in the preferred insulation boards 22 are expanded perlite particles preferably having a density of about 3 to about 6 pounds per cubic foot. Since the expanded perlite particles are inorganic, the expanded perlite particles contribute to the fire resistance of the insulation board. In addition, the perlite particles have excellent thermal insulating properties and greatly enhance the overall thermal insulating properties of the insulating boards.

The cellulosic fibers are used in the preferred perlite insulation boards 22 primarily for the strength that the cellulosic fibers add to the insulating board through the hydrogen bonding between the cellulosic fibers and an interfelting of the cellulosic fibers with the expanded perlite particles which assists in holding the expanded perlite particles in place within the insulation boards. The cellulosic fibers act as a bulking material to maintain the perlite insulation boards within the desired density range for such products.

The bituminous material in the preferred perlite insulation boards 22 provides the insulation boards with a greater resistance to water absorption and also assists the cellulosic fibers in holding the expanded perlite particles in place within the insulation boards. Preferably, the expanded perlite particles are pre-coated with the bituminous material before being introduced into the slurry of the wet forming operation. While other bituminous materials could be used in the perlite insulation boards 22, asphalt is the preferred bituminous material. Asphalt is economical, readily available and performs well in the perlite insulation boards 22.

The polymeric binder in the preferred perlite insulation boards 22 can be any of numerous commercially available latex binders which function to assist in holding the interfelted fibers and expanded perlite partides together in the insulation board and, preferably, improve the strength of the perlite based insulation board relative to perlite based insulation boards of comparable thickness, width, length and density using starch binders. Of the latex binders, the preferred latex binders are acrylic latex binders, poly(vinyl acetate) latex binders, and styrene/butadiene rubbers (SBR), such as but not limited to Dow DL 242NA SBR; BF Goodrich HYCAR 26138 acrylic; BF Goodrich HYCAR 26288 acrylic; Omnova Solutions GenFlo 8045 carboxy modified SBR polymer, and BF Goodrich GOODRITE SB706 SBR.

Other perlite insulation boards 22 which can be used in the single ply roofing membrane system 20, include by dry weight, about 45% to about 76% expanded perlite; about 15% to about 45% cellulosic fibers; about 0.1% to about 10% starch binder, about 2% to about 9% bituminous material; and about 0% to about 3% alum. Except for the starch binder (e.g. unmodified corn starch), the ingredients of these perlite insulation boards are the same as those used in the preferred perlite insulation boards with the latex binder.

The latex containing coating 24 on the upper major surface of the insulation boards 22 is preferably coextensive with the upper major surface of the insulation boards and weighs in dry weight about 1.1 grams per square foot (g/ft$^2$) to about 12.0 g/ft$^2$. Coatings 24 applied in amounts, dry weight, less than 1.1 g/ft$^2$ to the upper major surfaces of the insulation boards 22 may not provide sufficient coverage to sufficiently enhance the adherence of a single ply elastomeric roofing membrane 28 to the upper major surfaces of the insulation boards 22. Coatings 24 applied in amounts, dry weight, more than 12.0 g/ft$^2$ to the upper major surfaces of the insulation boards 22 do not further enhance the adherence of a single ply elastomeric roofing membrane 28 to the upper major surfaces of the insulation boards 22 and increase the cost of the coated insulation boards 22. Preferably, the coating 24 is applied in amounts, dry weight, of about 4.5 g/ft$^2$ to about 9.0 g/ft$^2$.

The coating includes, by dry weight, about 48.3% to about 96% filler, about 3.1% to about 33.3% latex; and 0% to about 34% sodium silicate, and preferably, by dry weight, about 62% to about 85% filler; about 8% to about 21% latex; and about 4% to about 21% sodium silicate. Preferably, the filler is kaolin clay and examples of latexes which may be used in the coating are: poly(vinyl acetate) latexes; acrylic latexes, and styrene/butadiene rubber latexes. A preferred latex is GenFlo 8045 carboxy modified SBR polymer manufactured by OMNOVA solutions. The sodium silicate in the coating provides the coating with a generally harder surface and may improve adhesion between the upper major surface of the roofing insulation boards 22 and the single ply roofing membrane 28.

The single ply roofing membrane 28 may be any of a number of commercially available single ply roofing membranes, such as but not limited to membranes made of ethylene propylene diene monomer rubber (EPDM), ethylene propylene diene terpolymer rubber (EPDM), ethylene propylene rubber (EPR), and alloys of ethylene propylene diene terpolymer rubber (EPDM) or ethylene propylene rubber (EPR) with polypropylene (thermoplastic olefin elastomers or TPO's) or poly(vinyl chloride). These single ply roofing membranes may be reinforced with reinforcing meshes or scrims 36 (e.g. polyester reinforcing meshes or scrims) located intermediate layers of the material forming the single ply roofing membrane.

The adhesives 30 used to bond or adhere the single ply roofing membrane 28 to the coated upper major surfaces of the roofing insulation boards 22 are commercially available roofing contact adhesives, such as but not limited to solvent based neoprene bonding cement, water based acrylic bonding cements, solvent based Nibtile Rubber bonding cements. These adhesives are generally applied to the upper coated major surfaces of the roofing insulation boards 22 in amounts, dry weight, ranging from about 10 to about 20 g/ft$^2$.

To test the adhesive bond between the coated insulation boards and single ply roofing membranes, laboratory samples of the preferred perlite insulation boards disclosed above, using starch and latex binders, were made by repulsing cellulosic fiber (source of fiber was surplus #1 News) in a hydropulper with warm water at approximately 120° F. The fiber was then collected and dewatered to about 20% solids. The actual solids determination was done by drying a small sample overnight Laboratory boards were made using a Williams 14 inch×14 inch hand sheet former. The desired amount of pulp was stirred into about thirty pounds of water and allowed to mix for three minutes. Asphalt emulsion was then added and allowed to stir for one minute. The binder (starch or latex) was added and mixed for two minutes. The pH was then checked and adjusted with alum to a pH of 5.3 to 5.8. At least 12 ml of alum (20%) was added to all formulations, regardless of the pH. The expanded perlite was then added and was mixed for thirty seconds beyond the point where all of the perlite was wetted-out. The slurry was then transferred to the Williams apparatus and the water was allowed to substantially free drain until the edges of the slurry pulled away from the headbox sidewalls, then vacuum was applied for forty-five seconds. The wet board was then pressed to 1" or ½" for two minutes and the latex containing coating of the present invention was applied to a major surface of the samples (about 10 to about 40 g wet/ft$^2$ or about 1.1 to 12.0 g dry/ft$^2$). The coated wet board was then passed twice through a conveyed forced air oven at about 400° F. (total residence time about one and one half hours) to dry the board and the coating. The perlite board and the coating were then dried at 250–270° F. overnight or over a weekend.

In addition to the laboratory samples, perlite insulation boards of various thicknesses and having the formulations disclosed above were also made for the tests on a conventional, commercial Fourdrinier manufacturing line. In the process newsprint fibers are broken down through the action of warm water and mechanical mixing in a hydropulper creating a slurry which is stored in a holding tank or chest The expanded perlite used in the formulation is produced by rapidly heating perlite ore in perlite expanders. When the perlite insulation board is made with a latex binder, the asphalt emulsion (a waterproofing agent), alum (retention aid), expanded perlite and latex binder are added to the slurry with the latex binder being added to the slurry after the asphalt emulsion has been added and prior to the addition of the other ingredients. When the perlite insulation board is made with a starch binder, the asphalt emulsion (a waterproofing agent), alum (retention aid), expanded perlite and starch binder are added to the slurry with the starch binder being added last In addition, a poly(acrylamide) retention aid diluted (inverted) prior to use (sold by Nalco Chemical Company, under the trademark Nalco 7520) was added via a separate pump in conjunction with the binder. The resulting mixture passes through a head box and is distributed uniformly over a continuously moving wire belt of the Fourdrinier machine where excess water is allowed to free-drain by gravity. The semisolid slurry (about 75% water at this point) was then sized to the approximate thickness with either a second wire or a felt belt. More water was then removed with the help of an applied vacuum to form a wet mat The coating of the present invention was then applied to a major surface of the wet mat by spraying or rolling the coating material onto the major surface (about 10 to about 40 g wet/ft$^2$ or about 1.1 to 12.0 g dry/ft$^2$). The wet, coated perlite board formed was then cut into mats and passed through a multi-deck, multizone dryer, e.g. a Coe dryer, for the completion of the drying process. The speed of the production line, as well as the temperatures of the different zones in the dry, vary with the density and thickness of the perlite insulation board being made. After exiting the dryer, the perlite insulation boards were cut into desired sizes by trim saws.

The relative strengths of the adhesive bonding of single ply roofing membranes 28: a) to the major surfaces of the laboratory and production line perlite boards, coated with the latex containing coating 24 set forth in Table I, below, and b) to uncoated major surfaces of wood fiber and isocyanurate foam roofing insulation boards, were estimated by measuring the peel resistances or strengths, set forth in Table II, below, of two inch wide strips of single ply roofing membrane adhered to the major surfaces of the boards with conventional, commercially available roofing contact adhesive applied in amounts between 10 and 20 grams dry/ft$^2$. Higher peel resistances or strengths were presumed to indicate better bonding between the single ply roofing membranes and the major surfaces of the insulation boards. Uncoated perlite insulation boards exhibited peel resistances in pounds per inch ranging from about 0.50 to about 0.94.

TABLE I

COATING FORMULATIONS USED ON PERLITE BOARDS

| | % WATER | % CLAY | % LATEX #1 | % LATEX #2 | % SODIUM SILICATE |
|---|---|---|---|---|---|
| LABORATORY SAMPLE | | | | | |
| 1 | 80 | 10 | 5 | | 5 |
| 2 | 73 | 15 | 2 | | 10 |
| 3 | 58 | 25 | 2 | | 15 |
| 4 | 58 | 25 | 10 | | 10 |
| 5 | 75 | 15 | 10 | | |
| 6 | 75 | 15 | | | 10 |
| 7 | 70 | 25 | | 2 | 3 |
| 8 | 73 | 15 | | 2 | 10 |
| PRODUCTION SAMPLE | | | | | |
| T1-1 | | | | | |
| T1-2 | 80 | 10 | 5 | | 5 |
| T2-1 | | | | | |
| T2-2 | 78 | 15 | 7 | | |
| T3-1 | | | | | |
| T3-2 | 85 | 15 | 4 | | |

CLAY - kaolin
LATEX #1 - GenFlo 8045 carboxy modified SBR polymer - about 50% solids
LATEX #2 - GenFlo 2000 - about 50% solids
SODIUM SILICATE - about 38% solids

TABLE II

PEEL RESISTANCE FOR FULLY ADHERED SINGLE PLY MEMBRANES

| LABORATORY SAMPLE | PEEL RESISTANCE (LB/IN) | PRODUCTION SAMPLE | PEEL RESISTANCE (LB/IN) |
|---|---|---|---|
| 1 | 4.35 | T1-1 | 2.78 |
| 2 | 2.66 | T1-2 | 1.74 |
| 3 | 3.31 | T2-1 | 2.25 |
| 4 | 3.78 | T2-2 | 3.15 |
| 5 | 5.10 | T3-1 | 1.94 |
| 6 | 2.91 | T3-2 | 1.94 |
| 7 | 0.23 | | |
| 8 | 3.19 | | |
| UNCOATED ISOCYANURATE FOAM | 1.38 | UNCOATED ISOCYANURATE FOAM | 2.48 |
| UNCOATED REGULAR DENSITY WOOD FIBER | 0.33 | UNCOATED REGULAR DENSITY WOOD FIBER | 1.06 |
| | | UNCOATED HIGH DENSITY WOOD FIBER | 0.95 |

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a coated roofing insulation board, comprising:

mixing together the following ingredients in water to form a slurry:
- expanded perlite about 45% to about 76% by dry weight;
- cellulosic fibers about 15% to about 45% by dry weight;
- latex binder about 0.1% to about 10% by dry weight;
- bituminous material about 2% to about 9% by dry weight; and
- alum about 0% to about 3% by dry weight;

forming the slurry into a wet mat;

applying a coating comprising, by dry weight about 48.3% to about 96% filler; about 3.1% to about 33.3% latex; and 0% to about 34% sodium silicate, to a first major surface of the wet mat; and drying the mat and coating to form a coated insulation board.

2. The method according to claim 1, wherein:
the dry latex coating weighs between 1.1 grams and 12.0 grams per square foot.

3. The method according to claim 1, wherein in the coating;
the filler is kaolin cl ay and the latex is selected from a group consisting of acrylic latexes; poly(vinyl acetate) latexes and styrene/butadiene rubber latexes.

4. A method of making a coated roofing insulation board comprising:

mixing together the following ingredients in water to form slurry:
- expanded perlite between about 45% and about 76% by dry weight;
- cellulosic fibers between about 15% and about 45% by dry weight;
- starch binder about 0.1% to about 10% by dry weight;
- bituminous material about 2% to about 9% by dry weight; and
- alum about 0% to about 3% by dry weight;

forming the slurry into a wet mat;

applying a coating comprising, by dry weight, about 48.3% to about 96% filler; about 3.1% to about 33.3% latex; and 0% to about 34% sodium silicate, to a first major surface of the wet mat; and drying the mat and coating to form a coated insulation board.

5. The method according to claim 4, wherein:
the dry latex coating weighs between 1.1 grams and 12.0 grams per square foot.

6. The method according to claim 4, wherein:
the filler is kaolin clay and the latex is selected from a group consisting of acrylic latexes; poly(vinyl acetate) latexes and styrene/butadiene rubber latexes.

* * * * *